United States Patent [19]
Bernacchi et al.

[11] Patent Number: 5,527,549
[45] Date of Patent: Jun. 18, 1996

[54] METHOD FOR MAKING IMPROVED FRIED, BATTERED AND BREADED FOODS

[75] Inventors: Donald B. Bernacchi, Chicago; Kwang L. Rho, Westmont; Irene G. Donhowe, Palos Hills; Joseph Janda, Midlothian, all of Ill.

[73] Assignee: Griffith Laboratories Worldwide, Inc., Alsip, Ill.

[21] Appl. No.: 211,362

[22] PCT Filed: Feb. 5, 1993

[86] PCT No.: PCT/US93/01066

§ 371 Date: Aug. 29, 1994

§ 102(e) Date: Aug. 29, 1994

[87] PCT Pub. No.: WO93/15619

PCT Pub. Date: Aug. 19, 1993

Related U.S. Application Data

[63] Continuation of Ser. No. 832,087, Feb. 6, 1992, abandoned.
[51] Int. Cl.⁶ .................................................. A23L 1/176
[52] U.S. Cl. ........................... 426/89; 426/92; 426/94; 426/102; 426/289; 426/293; 426/296; 426/302; 426/303
[58] Field of Search .................... 426/89, 92, 94, 426/102, 289, 293, 296, 302, 303, 552, 554, 555, 804

[56] References Cited

U.S. PATENT DOCUMENTS

| | | | |
|---|---|---|---|
| 2,791,509 | 5/1957 | Cosler | 426/302 |
| 3,092,500 | 6/1963 | Keil | 426/303 |
| 3,449,132 | 6/1969 | Luksas et al. | 426/102 |
| 3,653,925 | 4/1972 | Anker et al. | 426/302 |
| 3,676,158 | 7/1972 | Fischer et al. | 426/293 |
| 3,794,742 | 2/1974 | Harris et al. | 426/302 |
| 3,830,941 | 8/1974 | Luft et al. | 426/117 |
| 4,068,009 | 1/1978 | Rispoli et al. | 426/291 |
| 4,133,901 | 1/1979 | Fetzer et al. | 426/573 |
| 4,208,442 | 6/1980 | Evans et al. | 426/296 |
| 4,260,637 | 4/1981 | Rispoli et al. | 426/96 |
| 4,272,553 | 6/1981 | Bengtsson et al. | 426/241 |
| 4,283,425 | 8/1981 | Yuan et al. | 426/102 |
| 4,309,450 | 1/1982 | Seibert | 426/92 |
| 4,504,502 | 3/1985 | Earle et al. | 426/293 |
| 4,511,583 | 4/1985 | Olson et al. | 426/89 |
| 4,518,620 | 5/1985 | Monagle et al. | 426/291 |
| 4,520,034 | 5/1985 | Ishii et al. | 426/96 |
| 4,762,721 | 8/1988 | Holscher et al. | 426/94 |
| 4,767,637 | 8/1988 | Ek | 426/291 |
| 4,778,684 | 10/1988 | D'Amico et al. | 426/291 |
| 4,877,628 | 10/1989 | Stypula | 426/302 |
| 4,900,573 | 2/1990 | Meyers et al. | 426/302 |
| 4,935,251 | 6/1990 | Verhoef et al. | 426/94 |
| 4,943,438 | 7/1990 | Rosenthal | 426/92 |
| 4,963,378 | 10/1990 | Bhardwaj | 426/302 |
| 5,008,121 | 4/1991 | Bernacchi et al. | 426/89 |
| 5,019,403 | 5/1991 | Krochta | 426/89 |
| 5,120,562 | 6/1992 | Furcsik et al. | 426/549 |
| 5,126,152 | 6/1992 | Feeney et al. | 426/102 |
| 5,141,759 | 8/1992 | Sloan et al. | 426/102 |
| 5,164,215 | 11/1992 | Furcsik et al. | 426/549 |
| 5,171,605 | 12/1992 | Attenburrow et al. | 426/656 |
| 5,232,721 | 8/1993 | Polansky | 426/94 |
| 5,242,699 | 9/1993 | Bednar et al. | 426/302 |
| 5,262,185 | 11/1993 | Babka et al. | 426/291 |
| 5,302,410 | 4/1994 | Calder et al. | 426/637 |
| 5,324,534 | 6/1994 | Stevens et al. | 426/637 |
| 5,393,552 | 2/1995 | Busacker et al. | 426/637 |

FOREIGN PATENT DOCUMENTS

| | | |
|---|---|---|
| 445369 | 11/1990 | European Pat. Off. . |
| 78429 | 12/1982 | Japan . |

*Primary Examiner*—Esther M. Kepplinger
*Assistant Examiner*—Lien Tran
*Attorney, Agent, or Firm*—Laff, Whitesel, Conte & Saret, Ltd.

[57] ABSTRACT

A process for providing fried battered and breaded food products with enhanced crispiness and golden brown color, wherein fat, caloric content and loss of volatile flavor components are controlled and shelf life of the frying medium is increased, in which a substrate having a moisture content over about 35% is battered and breaded, coated with a protein dispersion and heated to form a protein film.

23 Claims, No Drawings

METHOD FOR MAKING IMPROVED FRIED, BATTERED AND BREADED FOODS

This application is a continuation of application Ser. No. 07/832,087, filed on Feb. 6, 1992, which has been abandoned.

BACKGROUND OF THE INVENTION

Consumers develop preferences for particular types of food based upon texture, i.e., the tactile experience caused by the food in their mouth in conjunction with the food's distinct physical and chemical characteristics. Fried battered and breaded foods are extremely popular, in good measure because of their crisp texture and their typically golden brown appearance. Indeed, the organoleptic desirability of many fried foods could be significantly improved if enhanced crispiness and golden brown appearance were obtained without overcooking the food or unduly increasing its uptake of oil by frying for extended periods. Additionally, since there is some loss of volatile flavor components during frying, the flavor of fried foods could be further enhanced by minimizing such losses.

When it comes to fried battered and breaded foods, there is another important consideration: consumers are becoming increasingly health-conscious. They are turning more and more to foods which are high in nutritional value and low in fat and in caloric content. Fried foods, which are typically high in both fat and calories, may derive up to 50% or more of their calories from fat absorbed during frying. To many health-conscious consumers, fried battered and breaded foods therefore are not considered an acceptable part of the daily diet. In order to satisfy such consumers, a balance must be achieved between supplying fried foods with the preferred crispiness and golden brown appearance while controlling the fat and caloric content of such foods.

This problem has been addressed in the prior art, albeit inadequately. U.S. Pat. No. 4,518,620 to Monagle, et al., which issued May 21, 1985, discloses a process for preparing baked breaded foods in which an overcoating of an egg white solution which is applied to increase the integrity and adhesion of the breading also serves as a barrier to fat absorption. Unfortunately, the final food product is tough or soggy, and therefore organoleptically undesirable.

U.S. Pat. No. 4,900,573 to Meyers, et al., which issued Feb. 13, 1990, relates to a coating composition for inhibiting oil absorption of food products. Although the coating composition reduces fat absorption, unfortunately it also produces a soggy texture and hence a significant loss of organoleptic appeal.

U.S. Pat. No. 4,935,251 to Vorhoef describes a process for preparing fried expanded dough pieces (e.g. croutons) with reduced oil penetration on frying which remain crispy when exposed to high temperature liquids such as soup. The process includes coating the expanded dough pieces with a thermosetting film forming material and then treating in the presence of oil to produce a moisture film around the dough pieces. This patent contains no teaching regarding either fried battered and breaded foods or substrates other than expanded dough pieces.

Finally, commercially fried foods are expensive due, at least in part, to the oil which is absorbed and therefore spent in conventional frying processes. Furthermore, when battered and breaded substrates are fried, batter and breading which comes off into the frying oil will shorten its shelf-life. Since oil is relatively costly, reducing the amount required in frying and extending its shelf-life are economically appealing.

Therefore, it would be highly desirable to develop a new process for providing fried battered and breaded food products with enhanced crispiness and golden brown color in which fat, caloric content and loss of volatile flavor components are controlled and in which the shelf life of the frying medium is increased by reducing fall-off of batter and breading in the frying process.

SUMMARY OF THE INVENTION

This invention relates generally to fried battered and breaded food products. More particularly, this invention relates to a new method for producing fried battered and breaded food products in which the food substrate has a moisture content in excess of about 35% by weight. This invention also relates to the fried battered and breaded food products prepared by treating such food substrates in accordance with the new method of the invention.

The method of the invention begins with the Choice of the proper food substrate. The substrates which may be used in the practice of this invention are meat, poultry, seafood, cheese, vegetables and fruit. All have moisture contents in excess of about 35% by weight.

The chosen substrate is coated with a conventional batter and bread crumbs are applied to the batter. The battered and breaded substrate is then coated with a film-forming, water-dispersible protein or a blend of film-forming, water-dispersible proteins by spraying, dipping or other conventional application process. Dip application, however, is preferred.

After coating, the film-forming water-dispersible protein must be allowed to stay in contact with the surface of the batter and breading for at least a minimum period of time ("residence time") before heating to form a thermally irreversible coating, as discussed below. It is preferred that the residence time be in excess of one minute.

The resulting food product will have a significantly enhanced crispiness and golden brown color and better flavor due to reduced loss of volatile flavor components, all without increasing frying times or oil uptake.

DETAILED DESCRIPTION OF THE INVENTION

The substrates which are intended to be treated in accordance with this invention are meat, poultry, seafood, cheese, vegetables and fruit. All have moisture contents in excess of about 35% by weight.

The batter may be any leavened or unleavened batter containing from about 50 to 75% by weight water and preferably about 60% by weight water. Thus, the dry ingredients of the batter may be any flour and/or starch. Preferred flours and starches include yellow corn flour, soft wheat flour, modified corn starch and combinations thereof. Optional additional dry ingredients include leavening, coloring and flavoring agents and hydrocolloids. One dry batter mix which has been found to be particularly useful in the practice of the invention contains: modified corn starch, yellow corn flour, soft wheat flour, coloring and flavoring agents.

The breading may be chosen from the group comprising hydrated or unhydrated, raw, fully cooked or partially cooked cereals such as wheat flour, corn flour, bread crumbs or corn flakes. The breading preferably is ground to at least 100% through a U.S. No. 4 sieve. The breading is applied to the food substrate by conventional procedures, including those referred to in the examples set out below.

We turn now to the protein coating. The protein coating will comprise an aqueous dispersion of a water-dispersible protein which, on heating, will yield a thermally irreversible film. In other words, the film produced on heating must withstand the subsequent application of heat. Also, the protein must be one which forms a film by dehydration rather than by gelling or coagulation.

Heating by frying is the preferred method of producing the film, although alternatively heating to form the thermally irreversible film may be carried out by baking or other methods. When the latter alternative heating techniques are "filmed" battered and breaded product would be fried time to produce the desired fried battered and breaded end product.

One preferred film-forming, water-dispersible in the practice of this invention is sodium Caseinares, which are typically used to improve the smoothness and texture of foods, are produced by solubilizing casein (the principal protein in milk) with an alkaline substance, such sodium, calcium, potassium, magnesium or ammonium hydroxide. See *Food Science Sourcebook*, Second Edition, by Herbert W. Ockerman, 1991.

Other useful film-forming, water-dispersible proteins include soy protein concentrate, soy protein isolate, protein concentrate, milk protein hydrolysate, and wheat gluten.

The water-dispersible protein should be applied in the form of an aqeous dispersion. The level of protein should be in the range of about 5 to 15 percent by weight, preferably about 8 to 12 percent by weight and most preferably at a level of about 10% by weight.

The application level of the protein dispersion should be sufficient to provide a coating of at least about 0.5 percent by weight of protein, based upon the weight of the battered and beaded substrate. Preferably the level of protein will be at least about 0.8 percent by weight and most preferably it will be at about 1.0 percent by weight. Thus, when a preferred about 10% protein dispersion is used, the fully coated battered and breaded product will contain about 10% by weight of the dispersion.

A desirable adjunct to the film-forming water-dispersible proteins of the coating of the present invention is a thermal gelling agent such as egg albumin. Egg albumin is a simple water-dispersible protein that is coagulable by heat which increases the adhesion and cohesion of the breading. Egg albumin when applied alone or with breading, results in a tough or soggy final fried food product. Alternative thermal gelling agents include hydroxypropylmethylcellulose, agar, gelatin and unmodified starches.

A coating comprising a blend of film-forming water-dispersible proteins and a thermal gelling agent such as egg albumin surprisingly significantly reduces fat absorption and maintains or enhances crispness to produce a crisp, moist and flavorful product, far superior to the tough or soggy product obtained when, for example, egg albumin is used alone. When such a blend of film-forming water-dispersible proteins and egg albumin is used, the film-forming, water-dispersible protein and the albumin should be present in the blend in a ratio of from about 1:1 to about 3:1 by weight, based on solids. In a preferred embodiment, water-dispersible, film-forming proteins and egg albumin would respectively constitute 7.5% and 2.5% solids by weight of the blend.

If initially the food substrate is unfrozen and it is to be subjected to freezing for storage, it is preferred that the freezing step not be undertaken until after the coating process is completed. When the product is to be frozen, freezing is preferably down to a temperature range of about 0° F. to −40° F.

Food substrates which are treated as described above will exhibit enhanced crispiness, golden brown color and enhanced flavor with reduced fat uptake. Also, battered and breaded substrates treated in accordance with the method of this invention are maintained more effectively during freeze/thaw storage cycles and are easier to handle due to improved batter/breading adherence. Finally, the shelf life of the frying oil is increased due to reduced fall-off of batter and breading.

In this application, the term "dispersion" is intended to refer to a mixture of protein and water, the term "disperse" is intended to refer to the action of mixing protein and water, and the term "protein" is intended to include proteins and protein salts. Also, the terms "fat absorption" and "oil absorption" have been used interchangeably in the application. Fat is a water-insoluble material derived from plants or animals, composed primarily of triglycerides. Fat typically refers to triglycerides that are semisolid at room temperature. Fat in its liquid state is called oil. See *Dictionary of Food Ingredients*, Second Edition, by Robert S. Igoe, 1989. Since fat is in a liquid form during frying, "oil" may appropriately be used as an alternative term.

EXAMPLES

The following examples are intended to be illustrative of the present invention and to teach one of ordinary skill in the art how to make and use the invention. These examples are not intended to limit the invention or its protection in any way.

Example 1

A coating was prepared by dispersing in water at a 10% solids level a blend of 7.5% solids by weight sodium caseinate and 2.5% solids by weight egg albumin and the balance water.

Battered and breaded chicken and fish patties were sprayed with this coating and then stored at 0° F. for a period of one month. Upon removal from storage, the products were fried and then presented to a sensory panel test and subjected to fat and moisture analyses.

Table 1 below lists the scales utilized in the sensory panel tests to evaluate the crispness, chewiness and flavor of the products sprayed with the protein blend and the controls:

TABLE 1

| | |
|---|---|
| Crispness: | 1 = very crisp – 9 = very soggy |
| Toughness: | 1 = very soft – 9 = very tough |
| Flavor: | 1 = very delightful taste – 9 = very unfavorable taste |

Recorded in Table 2 below are the results of the one-month freeze/thaw storage stability test. The data represent the mean values of three replicate samples at each condition.

The sensory panel test data show that the products sprayed with the protein coating maintained their crispness and were much crisper than the controls after one month of freeze storage. The other parameters, such as toughness and moisture content exhibited no difference. The fish and chicken patties treated with the protein blend respectively yielded an average 31% and 15% reduction in fat absorption over a three month study. The products sprayed with the protein coating exhibited superior texture and were lower in fat and hence lower caloric content than the untreated fried products.

TABLE 2

|  | Panel Test | | | Analysis | | % Fat Reduction |
|---|---|---|---|---|---|---|
|  | Crispness | Toughness | Flavor | % Fat | % Moisture |  |
| Chicken Patties | | | | | | |
| Protein Coating | 2.00 | 4.14 | 4.00 | 10.7 | 57.3 | 8.41 |
| Control | 4.14 | 3.86 | 4.86 | 11.6 | 57.4 | — |
| Fish Patties | | | | | | |
| Protein Coating | 2.71 | 3.86 | 4.00 | 7.59 | 59.7 | 29.1 |
| Control | 4.71 | 4.00 | 4.00 | 10.7 | 59.0 | — |

Table 3 illustrates the sensory panel test results after two months of freeze storage. The data show that the chicken and fish patties treated with the protein coating were crisper than the controls. The other two parameters do not appear to be statistically different, with the exception of the flavor of the treated chicken patties which had a better flavor than the control.

TABLE 3

|  | Crispness | Toughness | Flavor |
|---|---|---|---|
| Chicken Patties | | | |
| Protein Coating | 2.17 | 4.00 | 4.50 |
| Control | 3.83 | 4.33 | 5.83 |
| Fish Patties | | | |
| Protein Coating | 2.17 | 3.50 | 4.50 |
| Control | 4.00 | 4.00 | 4.50 |

Table 4 contains the results of the freeze/thaw storage stability test after three months. The panel test data still show that the products sprayed with the protein coating maintained their crispness and were much crisper than the controls even after three months of freeze storage. Toughness, flavor and moisture exhibited no significant differences during this period.

The fish and chicken patties dipped in the protein coating respectively yielded 33.1% and 17.9% reduction in fat absorption. It is believed that the higher fat reduction in fish was due to its morphological structure and the moisture content of its muscle tissue and fat. The products treated with the protein coating exhibited superior texture and flavor and were lower in fat and hence lower caloric content than the untreated fried product.

TABLE 4

|  | Panel Test | | | Analysis | | % Reduction |
|---|---|---|---|---|---|---|
|  | Crispiness | Toughness | Flavor | % Fat | % Moisture |  |
| Chicken Patties | | | | | | |
| Protein Coating | 2.25 | 4.50 | 5.00 | 11.5 | 58.0 | 17.0 |
| Control | 3.38 | 5.25 | 5.00 | 14.0 | 54.7 | — |
| Fish Patties | | | | | | |
| Protein Coating | 1.50 | 3.50 | 3.00 | 8.76 | 59.9 | 33.1 |
| Control | 3.75 | 2.25 | 3.00 | 13.1 | 56.6 | — |

Example 2

Battered and breaded commercial fish and chicken products were treated with the protein coating, generally in accordance with the procedure described above in Example 1, refrozen and then fried. The coating, however, contained a 1.0% solids level of sodium caseinate and no egg albumin.

The results, recorded below in Table 5, indicate the effect the coating had on fat absorption of fried commercial products. The data represent the mean values of three replicate samples of each fried commercial product. The reduction of fat absorption in the coated fish product ranged from approximately 29% to 48%, while the chicken patties yielded an 19.4% fat reduction. The reason for this difference appears to be that raw fish has a very low fat level relative to chicken. Therefore, effectively, the sole source of fat is that which is absorbed during frying.

TABLE 5

| Fried Commercial Product | % Fat Reduction |
|---|---|
| Chicken Patties | 19.4 |
| Fish Patties | 29.1 |
| Fish Fillets | 30.8 |
| Fish Strips | 48.3 |

The objective of this example was to determine the effect of residence time (contact time between protein coating and product surface) on the final fried battered and breaded product prepared in accordance with the present invention.

Pieces of frozen cod were prepared by the following five processes:

| Process 1 | Process 2 | Process 3 | Process 4 | Process 5 |
|---|---|---|---|---|
| apply batter | apply batter | apply batter | apply batter | apply batter |
| apply breading | apply breading | apply breading | apply breading | apply breading |
| | | coat with 10% sodium caseinate dispersion | coat with 10% sodium caseinate dispersion | coat with 10% sodium caseinate dispersion |
| | store under refrigeration for 45 minutes | store under refrigeration for 45 minutes | store at room temperature for 45 minutes | |
| immediately fry at 350° F. for 4 minutes | fry at 350° F. for 45 minutes | fry at 350° F. for 4 minutes | fry at 350° F. for 4 minutes | immediately fry at 350° F. for 4 minutes |

The level of fat and fat reduction in the final product was then examined with results as follows:

| Process | % Fat | % Fat Reduction |
|---|---|---|
| 1 | 9.54 | |
| 2 | 10.08 | |
| 3 | 8.39 | 16.8* |
| 4 | 7.43 | 26.9* |
| 5 | 8.99 | 5.88** |

*Process 2 as control
**Process 1 as control

This data demonstrates that fat reduction was not significant when the sodium caseinate dispersion was applied to the product and it was then immediately fried. Processes 3 and 4, in which the product was stored in refrigeration and at room temperature, showed greatest fat reduction. This example thus demonstrates the impact of a residence time before frying in reducing fat uptake in the final product. While the present invention is described above in connection with preferred or illustrative embodiments, the embodiments are not intended to be exhaustive or limiting of the invention. Rather, the invention is intended to cover all alternatives, modifications and equivalents included within its spirit and scope, as defined by the appended claims.

What is claimed is:

1. A process for producing improved fried battered and breaded food products comprising the steps of:
   first, selecting a food substrate having a water content of at least about 35% of weight;
   second, applying batter and breading to the food substrate when it is in an unfrozen state to form a battered and breaded substrate;
   third, applying to the battered and breaded substrate an aqueous dispersion of a water-dispersible protein which is capable of forming a thermally irreversible film by dehydration on heating and freezing the resulting battered, breaded and protein-dispersion-coated product; and then
   waiting at least about one minute and then heating to form the thermally irreversible film.

2. The process of claim 1 in which the food substrate is chosen from the group consisting of meat, poultry, seafood, cheese, vegetables and fruit.

3. The process of claim 1 in which the substrate is poultry.

4. The process of claim 1 in which the substrate is seafood.

5. The process of claim 1 in which the batter is applied by spraying or dipping.

6. The process of claim 1 in which the batter contains about 60% by weight water.

7. The process of claim 1 in which the breading is chosen from the group consisting of hydrated or unhydrated, raw, fully cooked or partially cooked cereals such as wheat flour, corn flour, bread crumbs or corn flakes.

8. The process of claim 1 in which the breading is ground to at least 100% through a U.S. No. 4 sieve.

9. The process of claim 1 in which the protein is chosen from the group consisting of caseinates, soy protein concentrate, soy protein isolate, whey protein concentrate, milk protein hydrolysate, and wheat gluten.

10. The process of claim 1 in which the protein is sodium caseinate.

11. The process of claim 1 in which the level of protein in the aqueous dispersion of water-dispersible protein is in the range of about 5 to 15 percent by weight.

12. The process of claim 1 in which the level of protein in the aqueous dispersion of water-dispersible protein is in the range of about 8 to 12 percent by weight.

13. The process of claim 1 in which the level of protein in the aqueous dispersion of water-dispersible protein is about 10 percent by weight.

14. The process of claim 1 in which the protein dispersion is applied at an application rate at least sufficient to provide about 0.5 percent by weight of protein, based upon the weight of the battered and breaded substrate.

15. The process of claim 1 in which the protein dispersion is applied at an application rate at least sufficient to provide about 0.8 percent by weight of protein, based upon the weight of the battered and breaded substrate.

16. The process of claim 1 in which the protein dispersion is applied at an application rate at least sufficient to provide about 1.0 percent by weight of protein, based upon the weight of the battered and breaded substrate.

17. The process of claim 1 in which the food substrate is initially unfrozen and is subjected to freezing for storage after the completion of the heating step.

18. The process of claim 1 in which the heating step is delayed at least about one minute, after applying the protein dispersion.

19. The process of claim 1 in which the heating step is carried out by frying.

20. The process of claim 1 in which a thermal gelling agent is combined with the protein dispersion before application to the battered and breaded substrate.

21. The process of claim 20 in which in the thermal gelling agent is egg albumin.

22. The process of claim 21 in which the egg albumin is blended with the protein in a ratio of from about 1:1 to 3:1 by weight, based on solids.

23. A process for producing improved fried battered and breaded food products comprising the steps of:
   first, selecting an unfrozen food substrate having a water content of at least about 35% of weight;
   second, applying batter and breading to the food substrate to form a battered and breaded substrate
   third, applying to the battered and breaded substrate an aqueous dispersion of a water-dispersible protein which is capable of forming a thermally irreversible film on heating;
   cooling to freeze the battered, breaded and protein dispersion coated substrate; and then heating to form the thermally irreversible film.

* * * * *

UNITED STATES PATENT AND TRADEMARK OFFICE
CERTIFICATE OF CORRECTION

PATENT NO. : 5,527,549

Page 1 of 2

DATED : June 18, 1996

INVENTOR(S) : Donald B. Bernacchi, et al.

It is certified that error appears in the above-indentified patent and that said Letters Patent is hereby corrected as shown below:

- In column 3, line 13, insert "beating" in place of "heating".

- In column 3, line 13, insert "used, the" after "are".

- In column 3, line 14, insert "at a later" after "fried".

- In column 3, line 17, insert "protein useful" after "water-dispersible".

- In column 3, line 18, insert "caseinate. Caseinates," in place of "Caseinares,".

- In column 3, line 21, insert "as" after "such".

- In column 3, line 26, insert "whey" after "isolate,".

- In column 3, line 29, insert "aqueous" in place of "aqeous".

UNITED STATES PATENT AND TRADEMARK OFFICE
CERTIFICATE OF CORRECTION

PATENT NO. : 5,527,549
DATED : June 18, 1996
INVENTOR(S) : Donald B. Bernacchi, et al.

It is certified that error appears in the above-indentified patent and that said Letters Patent is hereby corrected as shown below:

- In column 5, table 4, insert "% Fat Reduction" in place of % Reduction".

- In column 6, line 45, before "The objective" insert the heading "Example 3".

- In column 8, line 1, insert "claim 1" in place of "claim :".

- In column 8, line 58, insert "substrate;" in place of "substrate".

Signed and Sealed this

First Day of October, 1996

Attest:

BRUCE LEHMAN

*Attesting Officer*    Commissioner of Patents and Trademarks